US009838998B2

(12) United States Patent
Kim et al.

(10) Patent No.: US 9,838,998 B2
(45) Date of Patent: Dec. 5, 2017

(54) METHOD OF PROCESSING DOWNLINK DATA NOTIFICATION MESSAGE AND SERVER THEREFORE

(71) Applicant: LG ELECTRONICS INC., Seoul (KR)

(72) Inventors: Hyunsook Kim, Seoul (KR); Jaehyun Kim, Seoul (KR); Laeyoung Kim, Seoul (KR); Taehyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/429,015

(22) PCT Filed: Oct. 10, 2013

(86) PCT No.: PCT/KR2013/009063
§ 371 (c)(1),
(2) Date: Mar. 18, 2015

(87) PCT Pub. No.: WO2014/058244
PCT Pub. Date: Apr. 17, 2014

(65) Prior Publication Data
US 2015/0223197 A1    Aug. 6, 2015

Related U.S. Application Data

(60) Provisional application No. 61/711,747, filed on Oct. 10, 2012, provisional application No. 61/862,091, (Continued)

(51) Int. Cl.
*H04W 68/00* (2009.01)
*H04W 8/08* (2009.01)
(Continued)

(52) U.S. Cl.
CPC .......... *H04W 68/005* (2013.01); *H04W 8/08* (2013.01); *H04W 68/02* (2013.01);
(Continued)

(58) Field of Classification Search
None
See application file for complete search history.

(56) References Cited

U.S. PATENT DOCUMENTS

2006/0009241 A1  1/2006  Ryu et al.
2009/0141684 A1* 6/2009  Hashimoto ........... H04W 36/02
                                                    370/331
(Continued)

FOREIGN PATENT DOCUMENTS

EP    1 937 013 A1    6/2008
EP    2 600 668 A1    6/2013
(Continued)

OTHER PUBLICATIONS

U.S. Appl. No. 14/426,900, filed Mar. 9, 2015.

*Primary Examiner* — Idowu O Osifade
(74) *Attorney, Agent, or Firm* — Birch, Stewart, Kolasch & Birch, LLP

(57) ABSTRACT

The present invention provides a method for processing paging from a server managing mobility in a mobile communication network. The method comprises: receiving from a network node a notification with respect to downlink data to be relayed to user equipment; transmitting a paging signal with respect to the user equipment to one or more base stations; receiving a context request with respect to the user equipment from a different server; recognizing that the paging will fail if the context request with respect to the terminal is received before receiving a reply to the paging; relaying a context reply to the different server depending on
(Continued)

the recognition; and transmitting a processing request message with respect to the downlink data to the network node.

13 Claims, 19 Drawing Sheets

Related U.S. Application Data filed on Aug. 5, 2013, provisional application No. 61/869,069, filed on Aug. 23, 2013, provisional application No. 61/869,761, filed on Aug. 25, 2013.

(51) Int. Cl.
  *H04W 68/02* (2009.01)
  *H04W 72/04* (2009.01)
  *H04W 76/02* (2009.01)
  *H04W 88/08* (2009.01)

(52) U.S. Cl.
  CPC ....... *H04W 72/042* (2013.01); *H04W 76/021* (2013.01); *H04W 88/08* (2013.01)

(56) References Cited

U.S. PATENT DOCUMENTS

| | | | |
|---|---|---|---|
| 2010/0195621 A1* | 8/2010 | Kekki | H04W 48/17 370/332 |
| 2010/0312846 A1 | 12/2010 | Lu et al. | |
| 2010/0323700 A1* | 12/2010 | Bachmann | H04W 36/0066 455/436 |
| 2011/0294523 A1 | 12/2011 | Ai et al. | |
| 2012/0088507 A1 | 4/2012 | Legg et al. | |
| 2012/0106456 A1 | 5/2012 | Jin et al. | |
| 2012/0157132 A1 | 6/2012 | Olsson et al. | |
| 2012/0264443 A1* | 10/2012 | Ng | H04W 4/005 455/450 |
| 2012/0282941 A1 | 11/2012 | Lu et al. | |
| 2013/0029639 A1 | 1/2013 | Lee et al. | |
| 2013/0039339 A1* | 2/2013 | Rayavarapu | H04W 76/028 370/331 |
| 2013/0170438 A1 | 7/2013 | Nishida et al. | |
| 2013/0188555 A1 | 7/2013 | Olsson et al. | |
| 2013/0189951 A1 | 7/2013 | Lopez et al. | |
| 2013/0260811 A1 | 10/2013 | Rayavarapu | |
| 2013/0343325 A1 | 12/2013 | Nishida et al. | |
| 2014/0105028 A1* | 4/2014 | Bhaskaran | H04W 68/12 370/242 |

FOREIGN PATENT DOCUMENTS

| | | |
|---|---|---|
| EP | 2 690 916 A1 | 1/2014 |
| EP | 2 723 130 A2 | 4/2014 |
| KR | 10-1998-0043203 A | 9/1998 |
| KR | 10-2006-0043540 A | 5/2006 |
| KR | 10-2011-0112425 A | 10/2011 |
| WO | WO 2008/132163 A1 | 11/2008 |
| WO | WO 2010/078834 A1 | 7/2010 |
| WO | WO 2011/141154 A1 | 11/2011 |
| WO | WO 2011/15375 A1 | 12/2011 |
| WO | WO 2012/014342 A1 | 2/2012 |
| WO | WO 2012/128355 A1 | 9/2012 |

* cited by examiner

METHOD OF PROCESSING DOWNLINK DATA NOTIFICATION MESSAGE AND SERVER THEREFORE

CROSS REFERENCE TO RELATED APPLICATIONS

This application is the National Phase of PCT International Application No. PCT/KR2013/009063, filed on Oct. 10, 2013, which claims priority under 35 U.S.C. 119(e) to U.S. Provisional Application No. 61/711,747, filed on Oct. 10, 2012, 61/862,091, filed on Aug. 5, 2013, 61/869,069, filed on Aug. 23, 2013 and 61/869,761, filed on Aug. 25, 2013 respectively, all of which are hereby expressly incorporated by reference into the present application.

BACKGROUND OF THE INVENTION

Field of the Invention

The present invention relates to a paging procedure and a tracking area update procedure.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |

TABLE 1-continued

| REFERENCE POINT | DESCRIPTION |
|---|---|
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PDSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6 illustrates a connection process in a radio resource control (RRC) layer.

FIG. 6 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 7 shows an example in which a UE geographically moves, and FIG. 8 shows a problem that may arise in the example shown in FIG. 7.

As can be seen from FIG. 7, a first eNodeB 20a is connected with a first MME 51a, and a second eNodeB 20b with a second MME 51b.

UE 10 remains in RRC idle state in the coverage of the first eNodeB 20a. While UE 10 shifts from the coverage of the first eNodeB 20a to the coverage of the second eNodeB 20b, first MME 51a which has data to transmit to the UE sends a paging signal to the first eNodeB 20a as shown in FIG. 8.

Since the UE 10 which has been in RRC idle state in the coverage of the first eNodeB 20a moves into the coverage of the second eNodeB 20b, the UE 10 transmits a tracking area update (TAU) request to the second MME 52b through the second eNodeB 20b.

Meanwhile, the first eNodeB 20a fails to receive a response to the paging signal from the UE 10. Assume that the paging signal is a call. In this case, the UE 10 fails to receive a paging signal responsive to call reception, the UE 10 does not produce a bell sound or vibration, so that the user is not alerted. Further, the calling side suffers from call failure without any special reason.

SUMMARY OF THE INVENTION

The present disclosure aims to propose a method for addressing the above issues.

To achieve the above objects, the present disclosure provides a method of processing paging by a server managing mobility in a mobile communication network.

The method may comprise: receiving, from a network node, a notification about downlink data to be delivered to a terminal; transmitting, to at least one or more base stations, a paging signal for the terminal; receiving, from another server, a context request for the terminal; recognizing that the paging will be failed if the context request for the terminal is received before receiving a response to the paging; delivering a context response to the another server according to the recognition; and transmitting a request message for handling the downlink data to the network node.

If the context request for the terminal is received before receiving the response to the paging, a handling of the paging may be performed.

The handling of the paging may include: not retransmitting the paging signal even if a timer related to the paging is expired.

The handling of the paging may include: not informing the network node about a failure of the paging event if the paging is failed.

The context response transmitted according to the recognition may include: information on the paging; information required for allowing the another server to perform the paging or information required to setup a user plane bearer; and information for requesting not to perform a reselection or relocation of the network node.

The information on the paging may include: information for indicating that the notification about the downlink data has been received; information for indicating that the paging for the terminal is being performed; and information for informing that a user plane bearer is needed to be set in the anther server.

The information required for allowing the another server to perform the paging or information required to setup a user plane bearer may include: information included in the notification message about the downlink data.

The request message for handling the downlink data may include at least one of: a request for maintain a buffering for the downlink data; and a request for retransmitting the downlink data notification to the another server.

To achieve the above objects, the present disclosure provides a server managing mobility in a mobile communication network. The server may comprise: a transmitting/receiving unit configured to receive, from a network node, a notification about downlink data to be delivered to a terminal and transmit a paging signal for the terminal to at least one or more base stations; and a controller configured to recognize that the paging will be failed if the context request for the terminal is received before receiving a response to the paging. The controller is further configured to control the transmitting/receiving unit thereby delivering a context response to the another server according to the recognition and transmitting a request message for handling the downlink data to the network node.

The present disclosure may enhance service quality while preventing waste of paging cancellation network resources with a reduced call reception delay and an increased call reception success rate.

In particular, as set forth herein, the source MME 510a may be aware, by the TAU procedure, that the UE has been relocated earlier than the S-GW, and thus, the source MME 510a may recognize that paging will fail earlier than anything else. More specifically, the source MME may be aware through context exchange of the TAU procedure that the UE has moved his position, and the S-GW may happen to know that through a subsequent procedure, bearer modification process. As a result, the source MME 510a may be aware that paging will fail earlier than anything else. Accordingly, according to an embodiment of the present invention, the procedure performed by the source MME 510a may come effective.

Meanwhile, according to an embodiment of the present invention, the target MME may choose the optimal one among several schemes. For example, although transmitting a downlink notification is best for the S-GW, the target MME may select the most appropriate scheme among directly triggering/performing triggering, re-requesting the S-GW, and directly requesting the UE or eNB to set up a user plane bearer.

DESCRIPTION OF EXEMPLARY EMBODIMENTS

Figure 1:
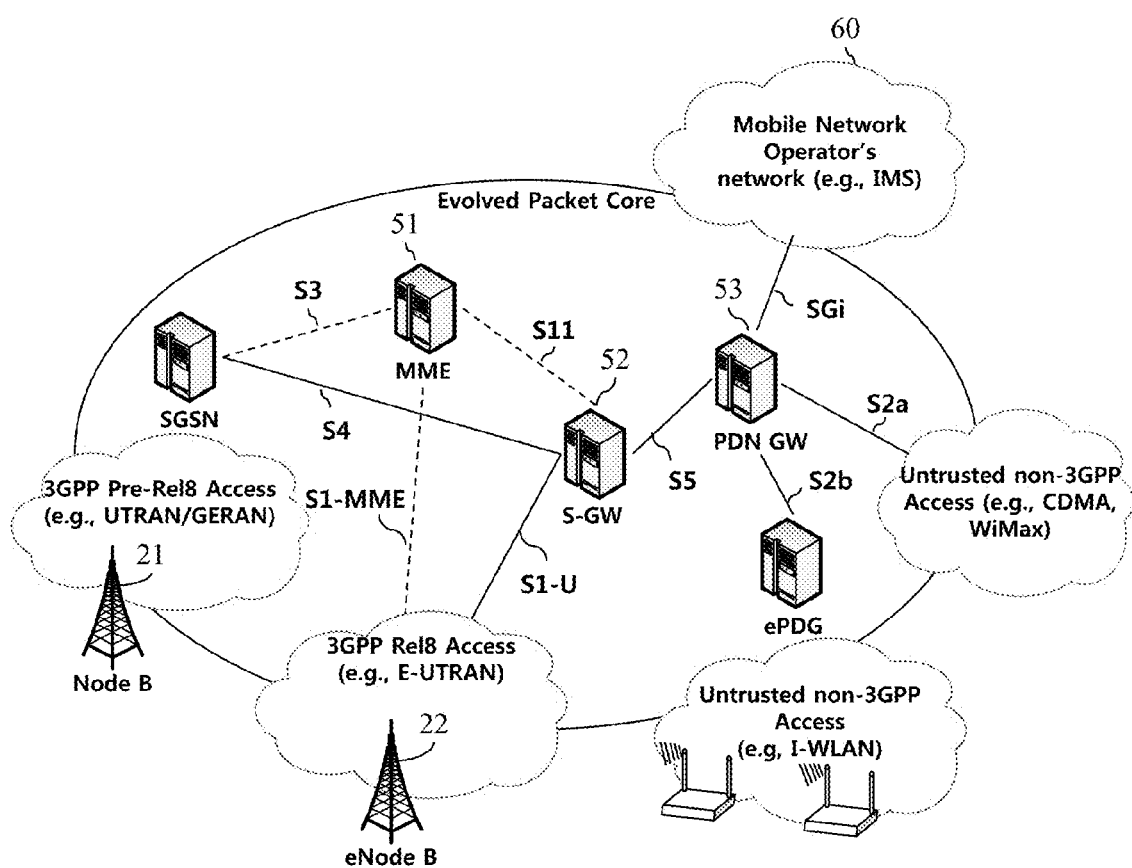
FIG. 1 is a view illustrating the structure of an evolved mobile communication network.
Figure 2:
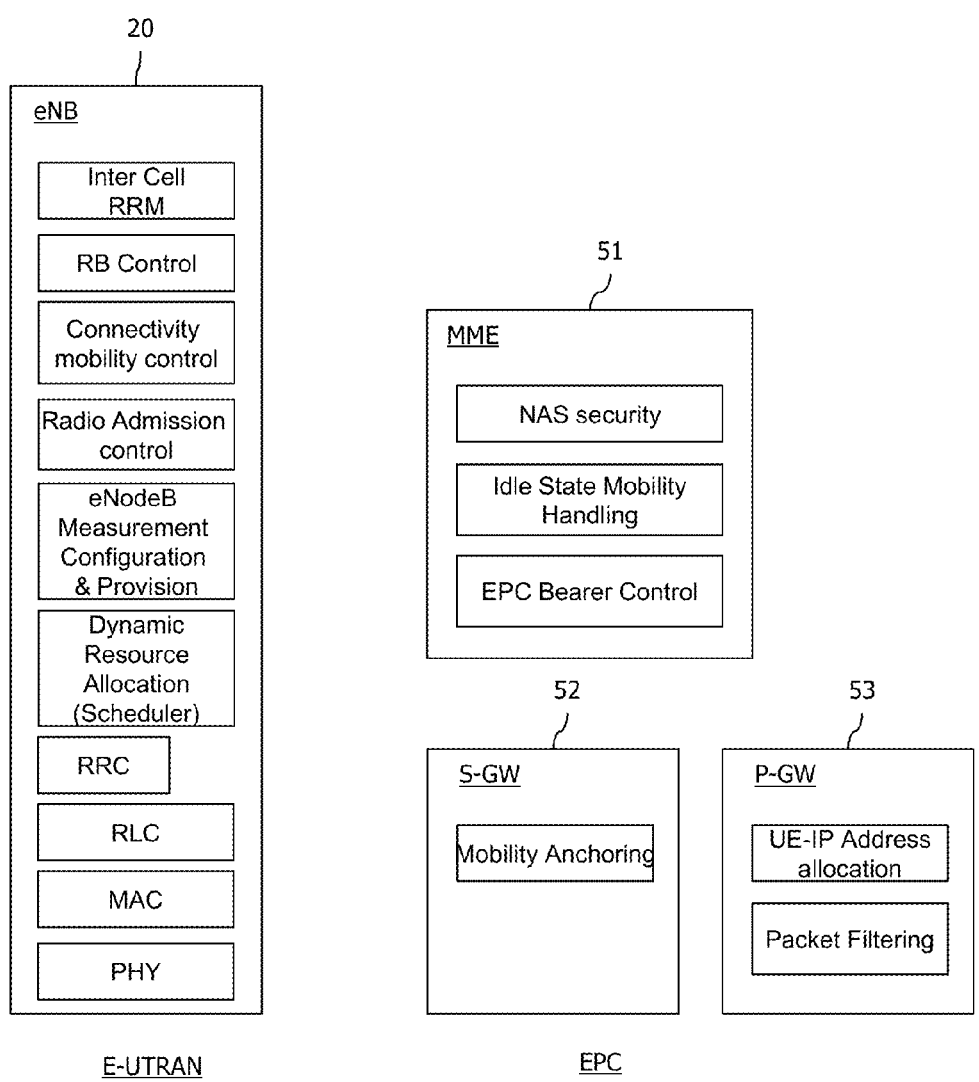
FIG. 2 is an exemplary view illustrating functions of main nodes of a common E-UTRAN and a common EPC.
Figure 3:
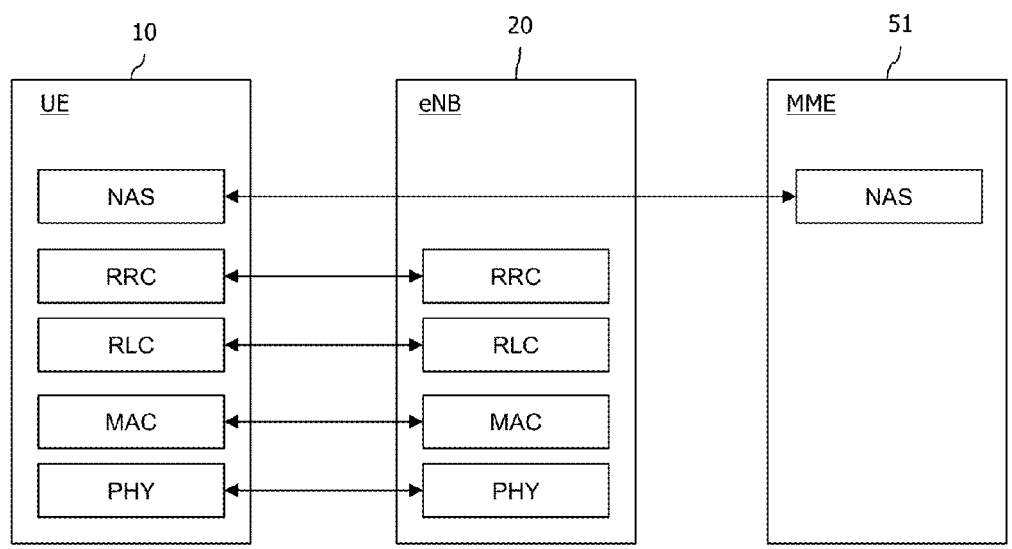
FIG. 3 is an exemplary view illustrating the structure of a radio interface protocol in a control plane between a UE and an eNodeB.
Figure 4:
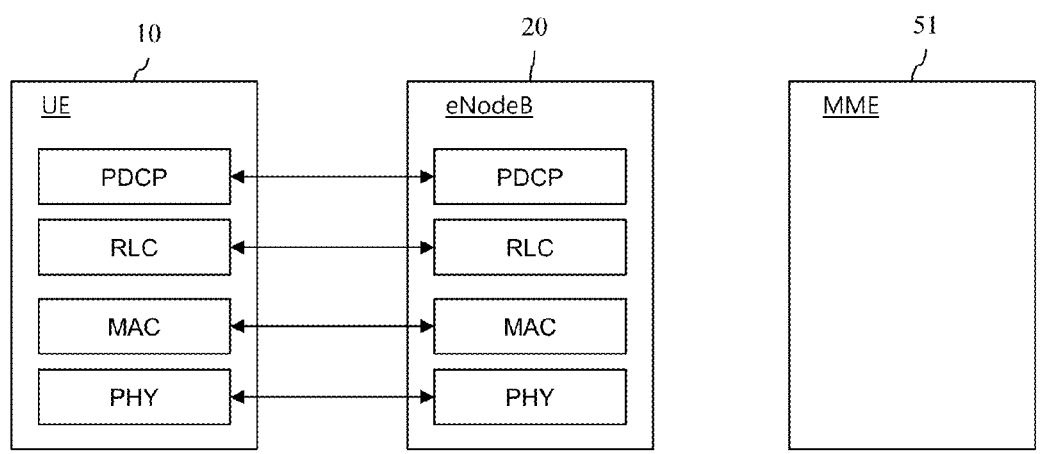
FIG. 4 is another exemplary view illustrating the structure of a radio interface protocol in a user plane between a UE and a base station.
Figure 5:
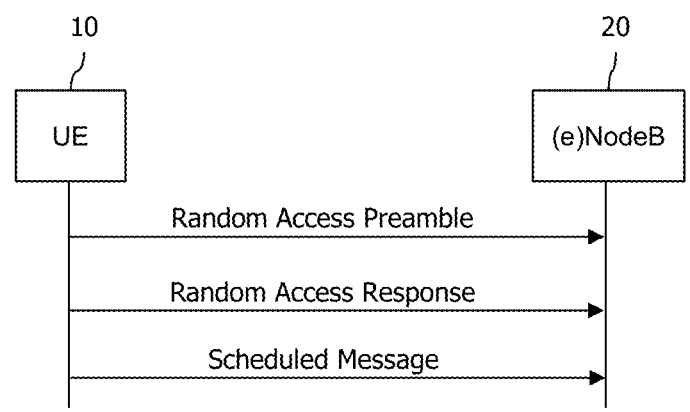
FIG. 5 is a flowchart illustrating a random access procedure in 3GPP LTE.
Figure 6:
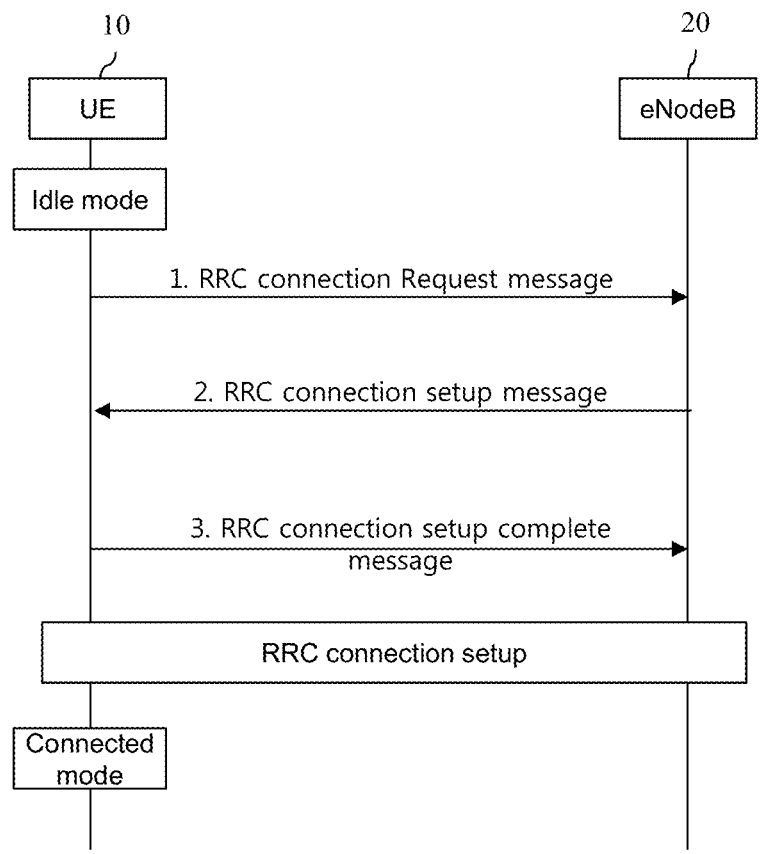
FIG. 6 illustrates a connection process in a radio resource control (RRC) layer.
Figure 7:
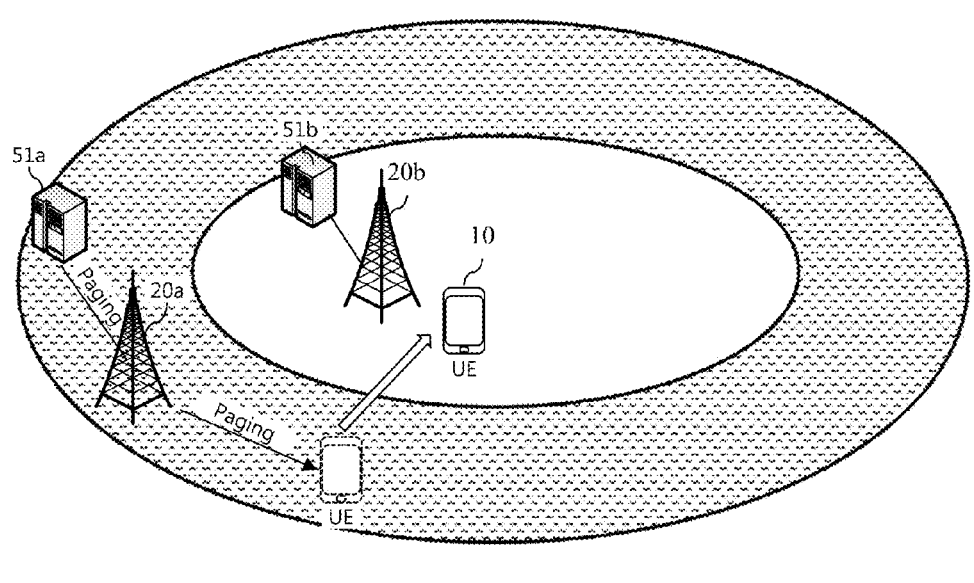
FIG. 7 illustrates an example in which a UE geographically relocates.
Figure 8:
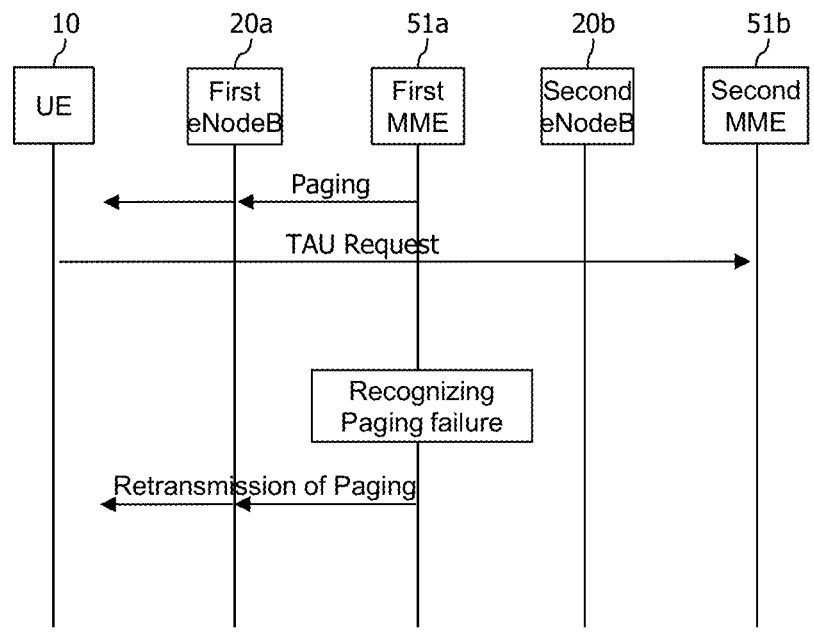
FIG. 8 illustrates a problem that may arise in the example shown in FIG. 7.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS EPS: stands for Evolved Packet System and means a mobile communication system including a UE, an access network including LTE, and an EPC PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality Hereinafter, the present disclosure is described with reference to the accompanying drawings.

Figure 9:
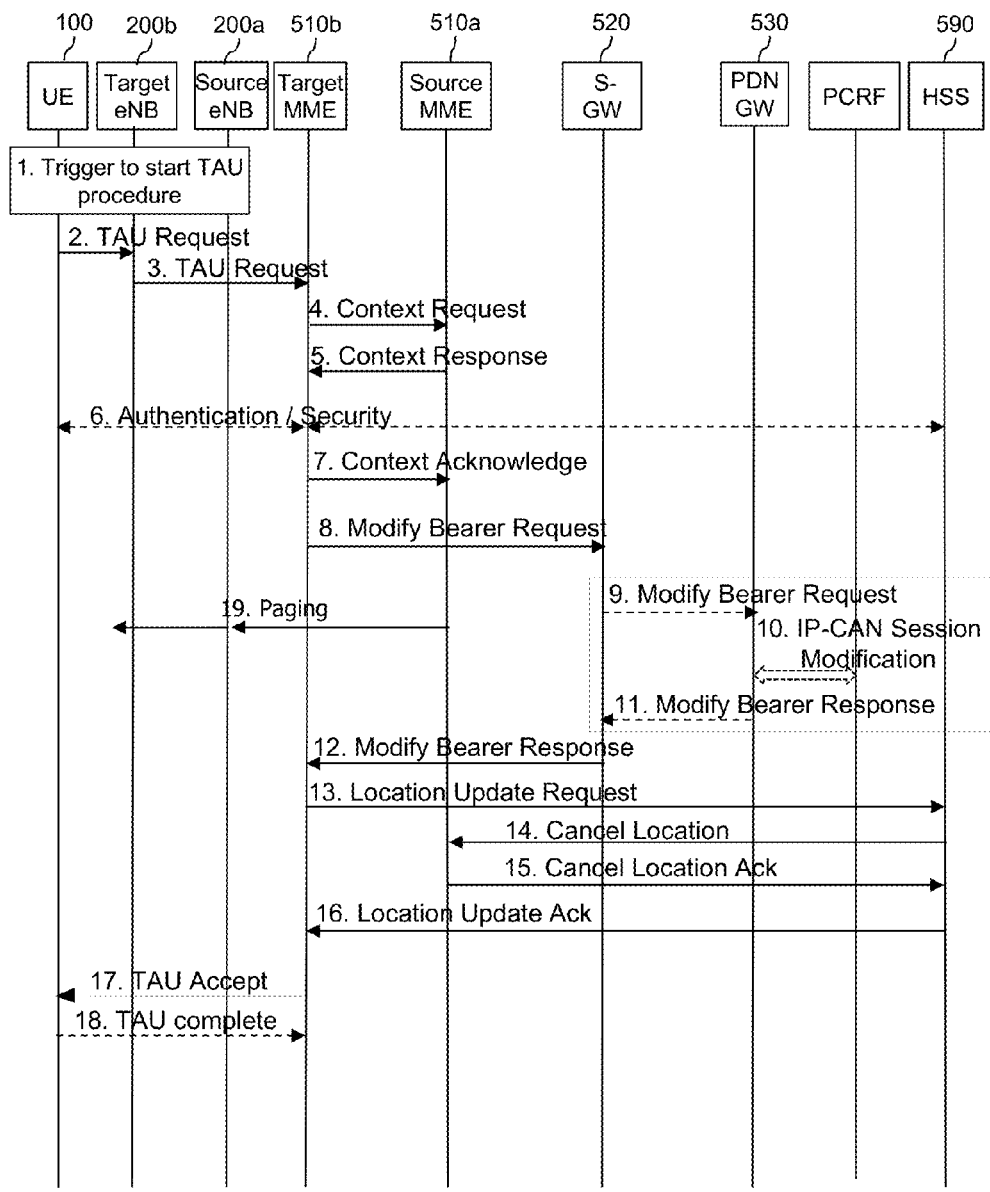
FIG. 9 is an exemplary view illustrating a TAU (Tracking Area Update) procedure.

FIG. 9 shows an exemplary TAU (Tracking Area Update) procedure.

1) In idle mode, the UE 100 moves into the coverage of the target eNodeB 200*b*. Accordingly, a TAU (Tracking Area Update) procedure is determined to start.

2) Then, the UE 100 sends a TAU request message to the target eNodeB 200*b*.

3) Then, the target eNodeB 200*b* determines a responsible MME. In this case, assume, for example, that the target MME 510*b* is determined as a proper responsible MME. The target eNodeB 200*b* transfers the TAU request message to the target MME 510*b*. In this case, assume that the S-GW 520 is not changed.

4-5) Then, the target MME 510*b* sends the UE's context request (e.g., Context Request) to the source MME 510*a*, and in response, receives a context response (e.g., Context Response). This is a process to obtain PDN connection-related information and EPS bearer-related information from the source MME 510*a*.

6) The UE 100 conducts an authentication/security procedure with the target MME 510*b*, and the target MME 510*b* conducts a security procedure with the HSS 590.

7) Meanwhile, the target MME 510*b* transmits to the source MME 510*a* a context acknowledge (e.g., Context Acknowledge) message in response to obtaining the context.

8) Subsequently, the target MME 510*b*, since the S-GW 520 is not changed by the TAU, transmits to the S-GW 520 a bearer modification request message (e.g., Modify Bearer Request), not a session creation request message (e.g., Create Session Request).

9-11) Then, the S-GW 520 transmits a bearer modification request message to the PDN-GW 530 as necessary. The PDN-GW 530 performs an IP-CAN session modification procedure as necessary. The PDN-GW 530 transmits a bearer modification response message (e.g., Modify Bearer Response) to the S-GW 520.

12) Then, the S-GW 520 transmits a bearer modification response message to the target MME 510*b*.

13) Then, the target MME 510*b* transmits to the HSS 590 a location update request message (e.g., Update Location Request).

14-15) Then, the HSS 590 transmits a location cancel message (e.g., Cancel Location) to the source MME 510*a*, and the source MME 510*a* transmits a location cancel acknowledgement message (e.g., Cancel Location Ack) to the HSS 590.

16) Then, the HSS 590 transmits a location update acknowledgement message (e.g., Update Location Ack) to the target MME 510*b*.

17-18) Then, the target MME 510*b* transmits a TAU accept message (e.g., TAU accept) to the UE 100 through the target eNodeB 200*b*, and the UE 100 transmits a TAU complete message (e.g., TAU Complete) to the target MME 510*b* as necessary.

Hereinafter, the following Table 2 to Table 9 show the messages used in each process.

First, the TAU request message may contain one or more pieces of information as shown in Table 2.

TABLE 2

Protocol discriminator
Security header type
Tracking area update request message identity
EPS update type
NAS key set identifier
Old GUTI
Non-current native NAS key set identifier
GPRS ciphering key sequence number
Old P-TMSI signature
Additional GUTI
NonceUE
UE network capability
Last visited registered TAI
DRX parameter
UE radio capability information update needed
EPS bearer context status
MS network capability
Old location area identification
TMSI status
Mobile station classmark 2
Mobile station classmark 3
Supported Codecs
Additional update type
Voice domain preference and UE's usage setting
Old GUTI type
Device properties
MS network feature support
TMSI based NRI container The EPC Update type information element shown in Table 2 above may contain the following bits.

TABLE 3

EPC Update Type Value

000: indicates TAU
001: indicates joint update of TAU/LA(Location Area)
010: indicates joint update of TAU/LA (Location Area) together with IMSI attach
011: indicates periodic update
100: unused (if used, interpreted as TAU)
101: unused (if used, interpreted as TAU)
"Active" flag (octet 1, bit 4)
0: bearer creation not requested
1: bearer creation requested Meanwhile, the above-described context request message may contain the information elements shown in the following Table 4.

TABLE 4

| Information elements | Conditions/descriptions |
|---|---|
| IMSI | should be included in case UE successfully authenticated |
| GUTI | A new target MME should include over S10 interface may be included if SRVCC procedure from UTRAN/GERN to E-UTRAN is available |
| Complete TAU request message | a new target MME may include if previous source MME needs it for acknowledgement of no decision |
| RAT Type | indicates what radio access technology is in use |
| Target PLMN ID | if available, may be included for previous MME to determine whether unused authentication vector is to be distributed |
| MME node name | is transferred by a new target MME if the new target MME and associated S-GW both support SR |

Meanwhile, the context response message may contain the information elements shown in the following Table 5.

TABLE 5

| Information element | Conditions/descriptions |
|---|---|
| IMSI | IMSI necessarily included except emergency even when UE does not have UICC |
| MME/SGSN UE EPS PDN Connections | Included in case at least one PDN connection is present for UE. |
| SGW node name | Indicates the identifier that has been used to identify S-GW by previous source MME |
| Trace Information | may be included in case session tracking is activated |
| Subscribed RFSP Index | May be included during mobility procedure between MMEs |
| UE Time Zone | Included by source MME |
| MME node name | Transmitted by previous source MME in case previous MME and associated S-GW both support ISR |

The information on the PDN connection in the context response message may contain the information elements shown in the following Table 6.

TABLE 6

| APN Restriction | Indicates limitations on combinations of APN types for APNs related to bearer context. Target MME or SGSN may determine the largest APN limitation using the APN limitations. |
|---|---|
| Linked EPS Bearer ID | Indicates basic bearer of PDN connection |
| PGW node name | may be included in case source MME has the overall name (e.g., FQDN) of PDN GW |
| Bearer Contexts | a number of pieces of information of such type may be included |
| Charging characteristics | May be included in case billing information is offered by HSS to MME |
| Change Reporting Action | May be included whenever available by source MME |

The bearer context information included in the PDN connection information in the context response may contain the information shown in the following Table 7.

TABLE 7

| Information elements | Conditions/descriptions |
|---|---|
| PGW S5/S8 IP Address and TEID for user plane | May be included for GTP-based S5/S8 |
| Bearer Level QoS | |
| BSS Container | MME may include packet flow ID, radio priority, SAPI, PS handover XID parameter in TAU/RAU/handover procedure-related message |
| Transaction Identifier | may be transmitted over S3/S10/S16 in case UE supports A/Gb and/or Iu mode |

The TAU accept message may contain the information shown in the following Table 8.

TABLE 8

| Information | Description |
|---|---|
| TAU accept message identifier | message identifier |
| TAU result | indicate result of update, e.g. success or fail |
| T3412 value | timer value for periodic TAU |
| T3402 value | timer starting upon TAU failure |
| T3412 extended value | extended value of T3412 for further lengthening periodic TAU |

In Table 8 above, the T3412 value is a value for allowing the UE 100 to conduct periodic TAU. In order to reduce network load by such periodic TAU, the T3412 extended value is present which allows TAU to be conducted at a longer period. The T3412 extended value may be set up in the MME or may be retained as subscriber information in the HSS 540.

19) Meanwhile, while the UE 100 performs a TAU procedure as above, as described in the Background section, the source MME 510a has data to transmit to the UE 10, it may transmit a paging signal to the source eNodeB 200a. The UE 100 has moved to the inside of the coverage of the target eNodeB 200b, and thus, it cannot receive a paging signal from the source eNodeB 200a.

The source MME 510a, unless receiving from the source eNodeB 200a a response to the paging signal until before a paging-related time value, e.g., the T3413 timer expires, the source MME 510a re-transmits the paging signal. The paging-related time value, e.g., the T3413 timer, may be a timer for re-transmission of the paging signal.

Resultantly, the paging signal is re-transmitted a predetermined number of times, and the caller is encountered with the situation where it keeps receiving the ring back tone.

Thereafter, if reaching the predetermined number of times, the source MME 510a reports paging failure to the S-GW. As a result, the calling side has inconvenience of call failure without any special reason, and the user of the UE 100 does not produce a bell sound or vibration because he has not received the paging for call reception, and thus, the user cannot receive any notification.

Schemes to address such inconvenience are now described. A brief description, prior to advancing to the details, is given below with the following two schemes.

(1) A Scheme for Enhancing Quality of User Service by Reducing Call Reception Delay The target MME 510b, after receiving a context response from the source MME 510a during a TAU procedure, i) identifies whether there is a specific indication as suggested herein. The specific indication indicates that the source MME 510a has done an activity for conducting paging on the UE or that the target MME 510b has received a downlink data notification on the UE from the S-GW. Subsequently, the target MME 510b ii) includes the specific indication in a TAU accept message and transmits the same to the UE 100. The specific indication may be contained in the TAU accept message to indicate that there is an operation that should be conducted when receiving a paging message or to inform the UE of presence of downlink data. The target MME 510b iii) conducts an operation for separately configuring a user plane bearer. For example, the target MME 510b transmits an initial context setup message to the target eNodeB 200b or may conduct a process for activating the user plane bearer of radio section for downlink data transmission.

(2) A Scheme for Avoiding Waste of Network Resources Due to Repetitive Paging

The target MME 510b, when receiving a context response from the source MME 510a during a TAU procedure, i) identifies whether there is a specific indication as suggested herein. The specific indication indicates that the source MME 510a has done an activity for conducting paging on the UE or that the target MME 510b has received a downlink data notification on the UE from the S-GW. ii) Subsequently, the target MME 510b may transmit to the source MME 510a a message for stopping paging. iii) Further, the target MME 510b may inform the S-GW that the previous downlink data notification should be canceled by separately sending to the S-GW information indicating that the UE has moved. The information allows the S-GW to stop waiting for a response to the paging transmitted previously. More actively, the target MME 510*b* may send to the source MME 510*a* a message for requesting to stop paging.

The above described two schemes may be summarized as follows in light of activity.

1) The target MME 510*b* determines whether the UE to which a paging signal is to be sent has moved, and if so, whether a TAU procedure proceeds. For example, the target MME 510*b* determines whether the UE to which a paging signal is to be transmitted has moved during the context exchange process between the target MME 510*b* and the source MME 510*a* and whether the TAU procedure is underway, and accordingly, the target MME 510*b* may request the source MME 510*a* to stop paging.

2) The target MME 510*b* may inform the S-GW 520 of what it has recognized in process 1) above during the message exchange for modifying bearer between the target MME 510*b* and the S-GW 520. In this process, the target MME 510*b* may send a request for stopping paging to the S-GW 520. Or, when receiving what has been recognized, the S-GW 520 may recognize that the paging procedure is not further required and conduct a subsequent procedure for canceling/stopping the paging procedure.

3) When transmitting a TAU accept message to the UE, the target MME 510*b* may add to the message information for enabling the UE 100 to start a task that the UE 100 should do when receiving a paging signal in the future. This allows the UE to get ready before receiving a paging signal to reduce a delay before receiving the paging signal, thus immediately enabling a user plane bearer to be set up.

4) When receiving the TAU accept message, the UE 100 immediately performs setup of a user plane bearer. Or, setup of a user plane bearer which is initiated by a network is immediately done by the network.

A more detailed description is given below in connection with the drawings.

Figure 10:
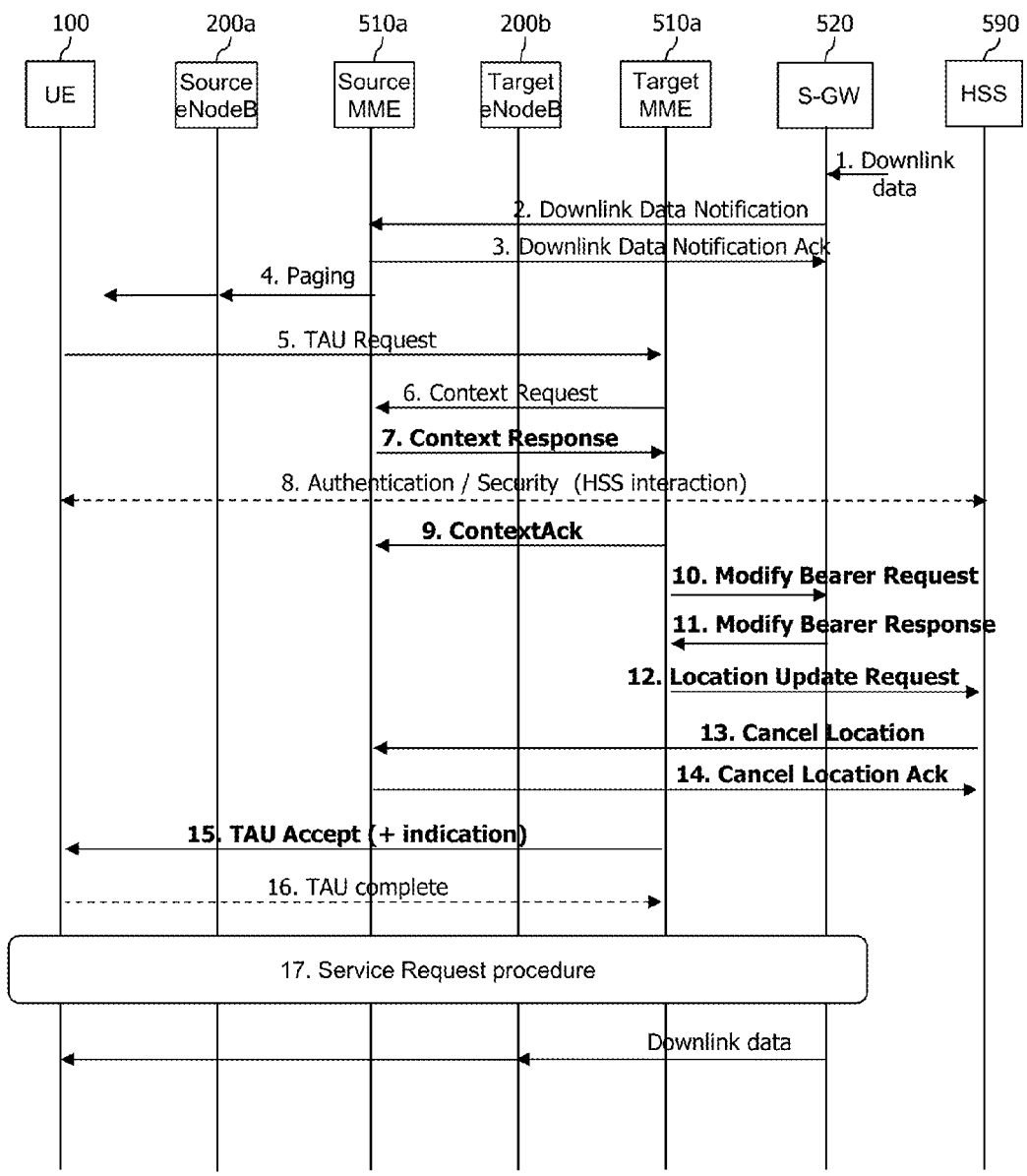
FIG. 10 is an exemplary view illustrating a TAU (Tracking Area Update) procedure as proposed herein.

FIG. 10 is a view illustrating an exemplary TAU (Tracking Area Update) procedure as proposed herein.

The overall process is similar to that described above in connection with FIG. 9. Hereinafter, differences between the two processes are primarily described, with no repetitive description made.

As per the procedure illustrated in FIG. 10, a condition is added to trigger the setup of a user plane bearer to put the setup of the user plane bearer in an earlier time.

1) The S-GW 520, upon reception of downlink data to be transmitted to the UE 100, stores the downlink data in a buffer and identifies which MME is in charge of the UE 100.

2) The S-GW 520 transmits a downlink data notification to the source MME 510*a*. The downlink data notification may include an ARP, an EPS, a bearer ID, etc.

3) The source MME 510*a* transmits a downlink data notification acknowledgement message to the S-GW 520.

4) Subsequently, the source MME 510*a* transmits paging signals to all the eNodeBs (including the source eNodeB 200*a*) belonging to the tracking area where the UE 100 is in registration in order to convey the paging signal to the UE 100. In this case, the source MME 510*a* may use the EPS bearer ID included in the downlink data notification message received from the S-GW 520 in order to apply and control a paging-related policy. That is, the source MME 510*a* may identify the EPS bearer context information stored in the MME by the EPS bearer ID.

However, the idle UE 100 departs from the coverage of the source eNodeB 200*a* to the coverage of the target eNodeB 200*b*. Accordingly, the UE 100 cannot receive the paging signal.

5-6) Accordingly, the UE 100 transmits a TAU request message to the target MME 510*b* through the target eNodeB 200*b*, and the target MME 510*b* transmits a context request message to the source MME 510*a*.

7) The source MME 510*a* transmits a context response message to the target MME 510*b*. In this process, the source MME 510*a* may inform the target MME 510*b* that the paging signal has been transmitted to the UE 100. This information may be direct information or may be transferred in various forms of implicit information so that the target MME 510*b* may recognize the same. Or, the target MME 510*b* may realize any problematic situation based on additional information collected from the eNodeB or other network node.

8) An authentication/security procedure is performed as described above.

9) The target MME 510*b* transmits a context acknowledgement message to the source MME 510*a*. In this process, the target MME 510*b* may include in the message information for canceling or stopping the existing paging.

10) The target MME 510*b* transmits a bearer modification request message to the S-GW 520. In this process, the target MME 510*b* may inform the S-GW 520 of what it has recognized. Additionally, in this process, the target MME 510*b* may include in the message information for canceling or stopping paging. That is, when obtaining the recognized information, the S-GW 520 realizes no further paging process is required, conducting a subsequent procedure for canceling or stopping the previous paging.

11) The S-GW 520 transmits a bearer modification response message to the target MME 510*b*. In this process, the S-GW 520 may include in the message information indicating advancing the time of setup of a user plane bearer. This information may contain information that may have an effect on when the target MME 510*b* creates a message to be transmitted to the UE 100, and additional information to be used for setup of a user plane bearer, if needed, may be transmitted together. Or, the information included in the downlink data notification may be additionally included.

12) As described above, the target MME 510*b* transmits a location update request message to the HSS 590.

13-14) As described above, the HSS 590 transmits a location cancel message to the source MME 510*a* and receives a location cancel acknowledgement message. In this case, some of the above mentioned pieces of information may be stored in the HSS 590.

15) The target MME 510*b* transmits a TAU accept message to the UE 100. In this process, the TAU accept message may include an indication for indicating that setup of a user plane bearer be immediately performed like the UE 100 is the UE targeted for the previous paging and a service request procedure should be performed in response to the paging. For example, the indication may be of a form similar to the "active flag." The "active flag" is included in the TAU request message as shown in Table 2, and this may be included in the TAU accept message according to an embodiment of the present invention.

Meanwhile, the target MME 510*b* may first initiate an operation for user plane bearer setup. For example, in case the active flag is conventionally included in the TAU request message, the user plane bearer setup may be performed immediately when the TAU accept message is transmitted. As an application thereto, the target MME 510*b* may include the active flag in the TAU accept message and transmit the same, so that the user plane bearer setup procedure may be immediately conducted.

16) The UE may transmit a TAU complete message to the source MME 510a as necessary.

17) Meanwhile, the UE 100 may perform a service request procedure when receiving the TAU accept message like it receives a paging signal. For example, in case the TAU accept message includes the active flag, it may perform a service request procedure like it received a paging signal. Or, other processes necessary for user plane bearer setup (procedure for setup of a radio bearer between the UE and the eNodeB) may come along.

Figure 11:
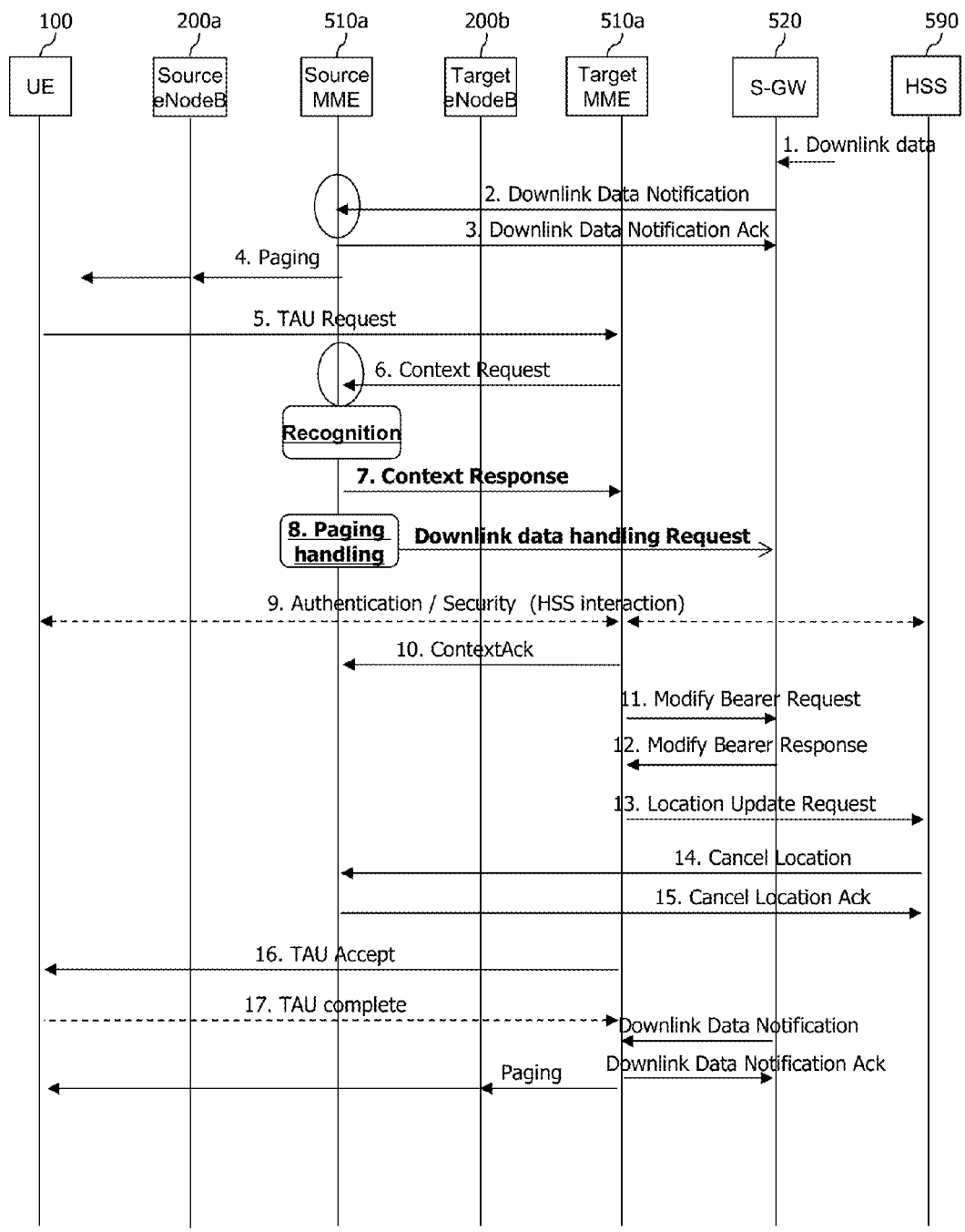
FIG. 11 is an exemplary view illustrating a TAU (Tracking Area Update) according to a first embodiment of the present invention.

FIG. 11 is a view illustrating an exemplary TAU (Tracking Area Update) procedure according to a first embodiment of the present invention.

FIG. 11 illustrates a scheme that may be conducted by the source MME 510a according to the first embodiment of the present invention.

All the processes shown are similar to those shown in FIGS. 9 and 10. Hereinafter, differences between the two schemes are primarily described, with no repetitive description made.

1-5) the same as those shown in FIG. 10

6-7) The target MME 510b transmits a context request message to the source MME 510a to obtain EPS bearer context information of the UE.

7) The source MME 510a, if receiving the context request in the state where it has transmitted a paging signal after receiving a downlink data notification message as described above, happens to recognize that the paging may fail.

Accordingly, the source MME 510a includes one of the following information pieces in the context response message to be sent to the target MME 510b and transmits the same.

TABLE 9 i) Indication to simply inform occurrence of problem in paging
  downlink data notification for the UE has been received
  paging for the UE is underway
  target MME 510b requires paging or user plane bearer setup
This information may be direct or may be transmitted in various forms of implicit information
so that target MME 510b may recognize the same
ii) Information necessary to trigger active behavior of target MME 510b
Additionally, source MME 510a may transmit information necessary for target MME 510b to
directly perform paging or information necessary for user plane bearer setup (for example,
information pieces included in the downlink data notification)
iii) In CSFB MT call scenario, source MME 510a receives a paging request from MSC, and
considering this situation, source MME 510a transmits to target MME 510b information
indicating whether the call for current paging is CS (circuit switching) call or PS (packet
switching) call also. Besides, information received from MSC may be sent as well.
iv) Source MME 510a requests target MME 510b not to perform S-GW reselection (or
relocation). S-GW swapping may occur during TAU procedure, e.g., due to load balancing.
As such, in case ME with downlink data relocates to a new MME during paging, if S-GW
swapping happens, a reception call has a high chance of failure. This is to prevent possible S-
GW swapping.

8) Then, the source MME 510a, even when not receiving a response from the UE until the paging timer, e.g., the T3423 timer, expires, ① does not re-transmit a paging signal, ② nor does the source MME 510a send a message for the paging failure (see TS 29.274, Downlink Data Notification Failure Indication) to the S-GW 520. According to the prior art, the source MME 510a is able to conduct a paging re-transmission policy, and in case the S-GW 520 receives a message for paging failure, it deletes the downlink data buffered for the UE. The above is to prevent this.

In a more active scheme, the source MME 510a may transmit a downlink data handling request including one of the following information pieces to the S-GW 520.

TABLE 10

Request to maintain buffering the downlink data
request to re-transmit downlink data notification after recognizing target
MME 510b Process 8) above may be performed in conjunction with other processes without bothered by the order as shown.

9) similar to the process shown in FIG. 10.

10) The target MME 510b transmits a context acknowledgement message to the source MME 510a. In this case, the target MME 510b may include in the context acknowledgement message information relating to paging handling such as information to request the source MME 510a to cancel or stop the existing paging. After receiving this message, the source MME 510a may send a downlink data handling request message to the S-GW 520 as in process 8) above.

11-17) similar to the process shown in FIG. 10.

Figure 12:
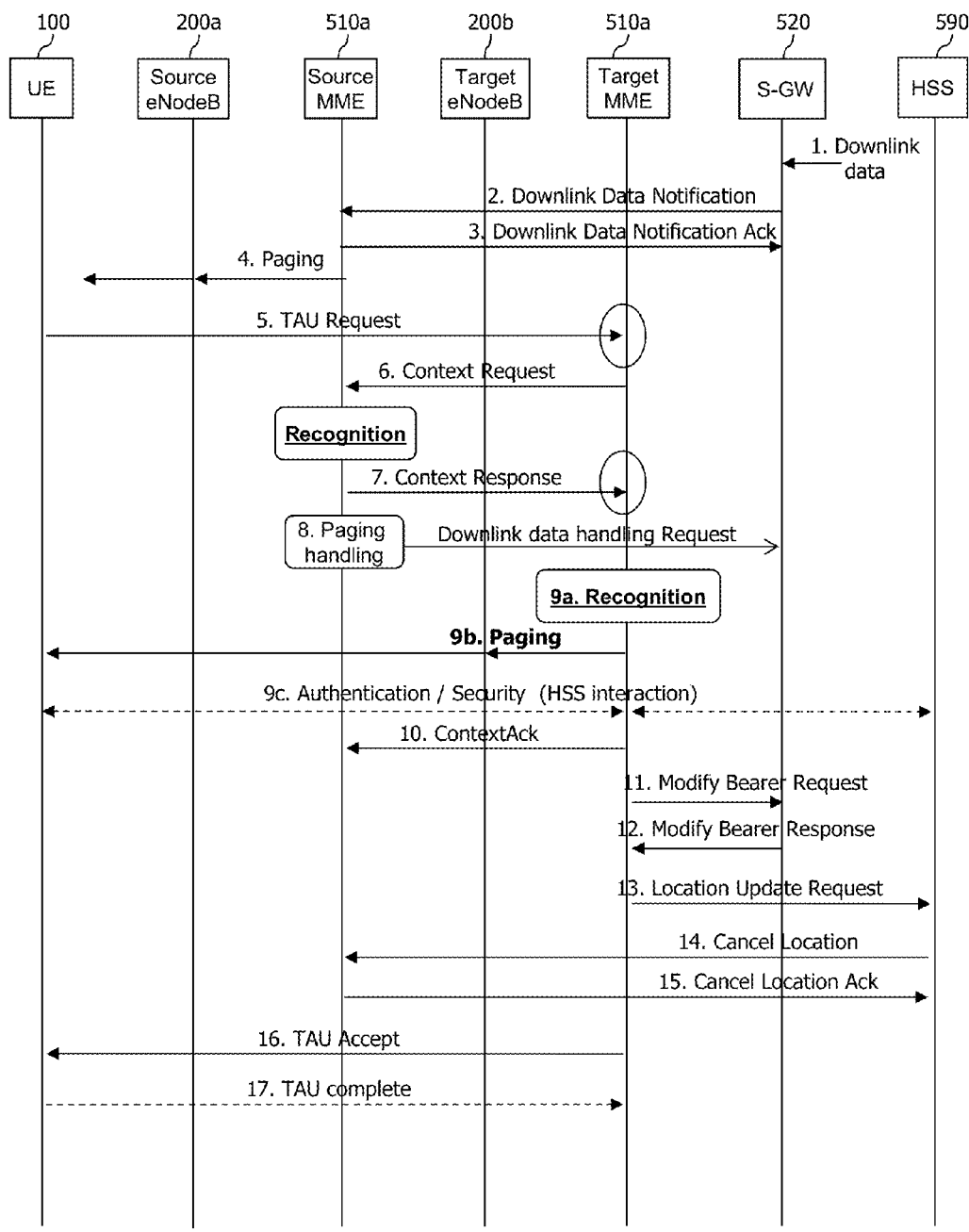
FIG. 12 is an exemplary view illustrating a TAU (Tracking Area Update) according to a second embodiment of the present invention.

FIG. 12 is a view illustrating an exemplary TAU (Tracking Area Update) procedure according to a second embodiment of the present invention.

FIG. 12 illustrates a scheme that may be conducted by the target MME 510b according to the second embodiment of the present invention. That is, according to the second embodiment, the target MME 510b may immediately transmit a paging signal.

All the processes shown are similar to those shown in FIGS. 9 to 11, and accordingly, differences between the two schemes are primarily described, with no repetitive description made.

1-8) similar to each process shown in FIG. 11.

9a-9b) as in process 7) of FIG. 11, when receiving a context response, the target MME 510b immediately performs paging if recognizing a problematic situation (where the source MME 510a has been transmitting a paging signal to the UE or there is downlink data for the UE).

In this case, various schemes may come along to perform paging.

As a first scheme, the target MME 510b immediately creates a TAI list for the UE 100 and transmits paging signals to all the eNodeBs included in the list. Of course, even according to the prior art, the MME may create a TAI list during a TAU procedure, includes the list in a TAU accept message, and sends the same to the UE while transmitting paging signals to all the eNodeBs in the list. However, according to the second embodiment of the present invention, the target MME 510b recognizes a problematic situation and conducts paging immediately when receiving the context response message, thus advancing the time of paging, which makes the present invention distinct from the prior art.

As a second scheme, the target MME 510b may know which eNodeB it has been through from the TAU request message, i.e., in the coverage of which eNodeB the UE is in. Accordingly, rather than sending paging signals to all the eNodeBs in the TAI list, the target MME 510b may transmit a paging signal only to a corresponding eNodeB.

As a third scheme, the target MME 510b may have information regarding more exact location of the UE, such as the cell ID of the UE, from the TAU request message. Accordingly, the target MME 510b may add a specific indication or cell ID information to a paging signal that is to be sent to a corresponding eNodeB rather than sending paging signals to all the eNodeBs in the TAI list, so that the paging signal is sent to the corresponding cell only.

Figure 15:
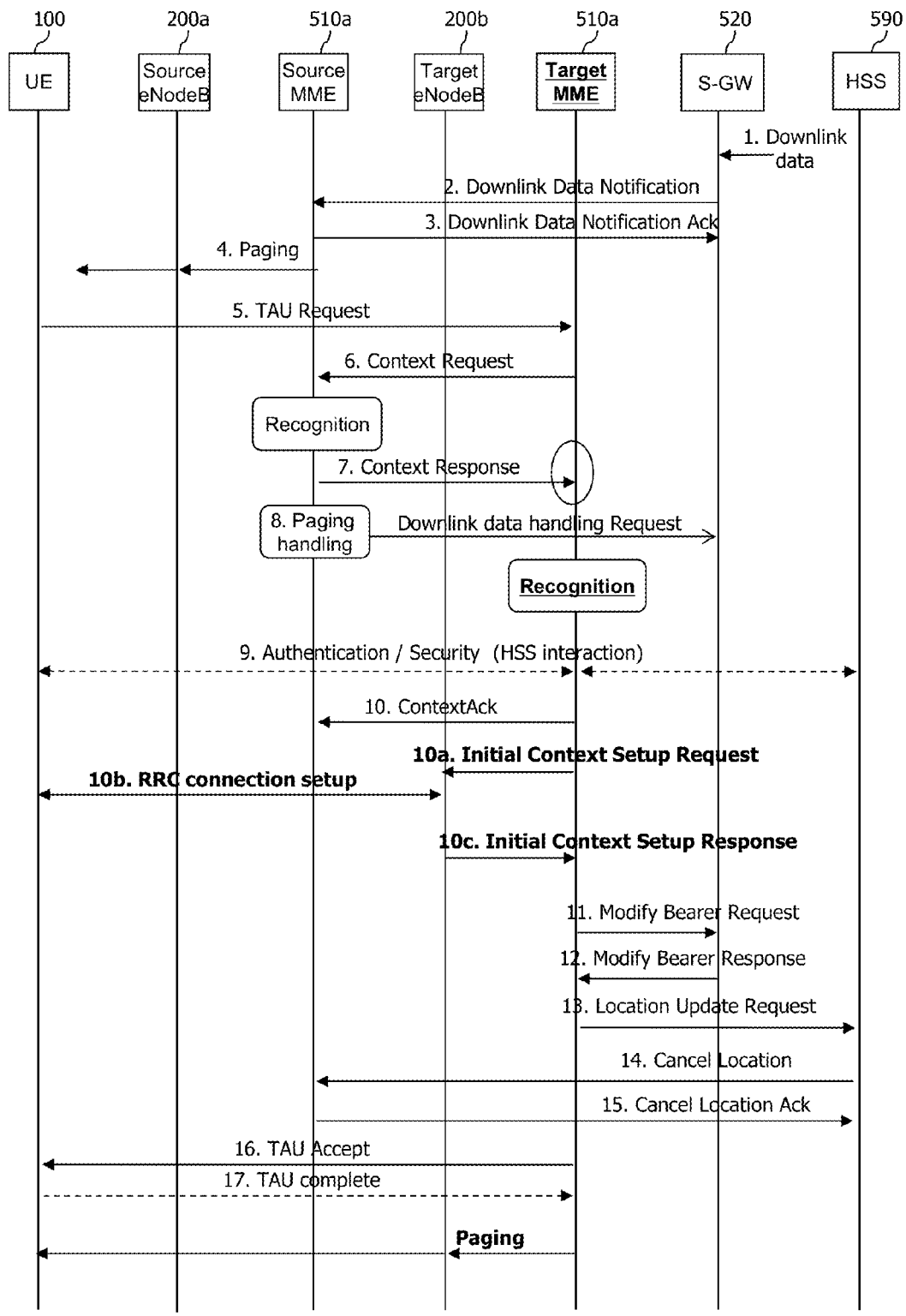
FIG. 15 is an exemplary view illustrating a TAU (Tracking Area Update) according to a fifth embodiment of the present invention.
Figure 16:
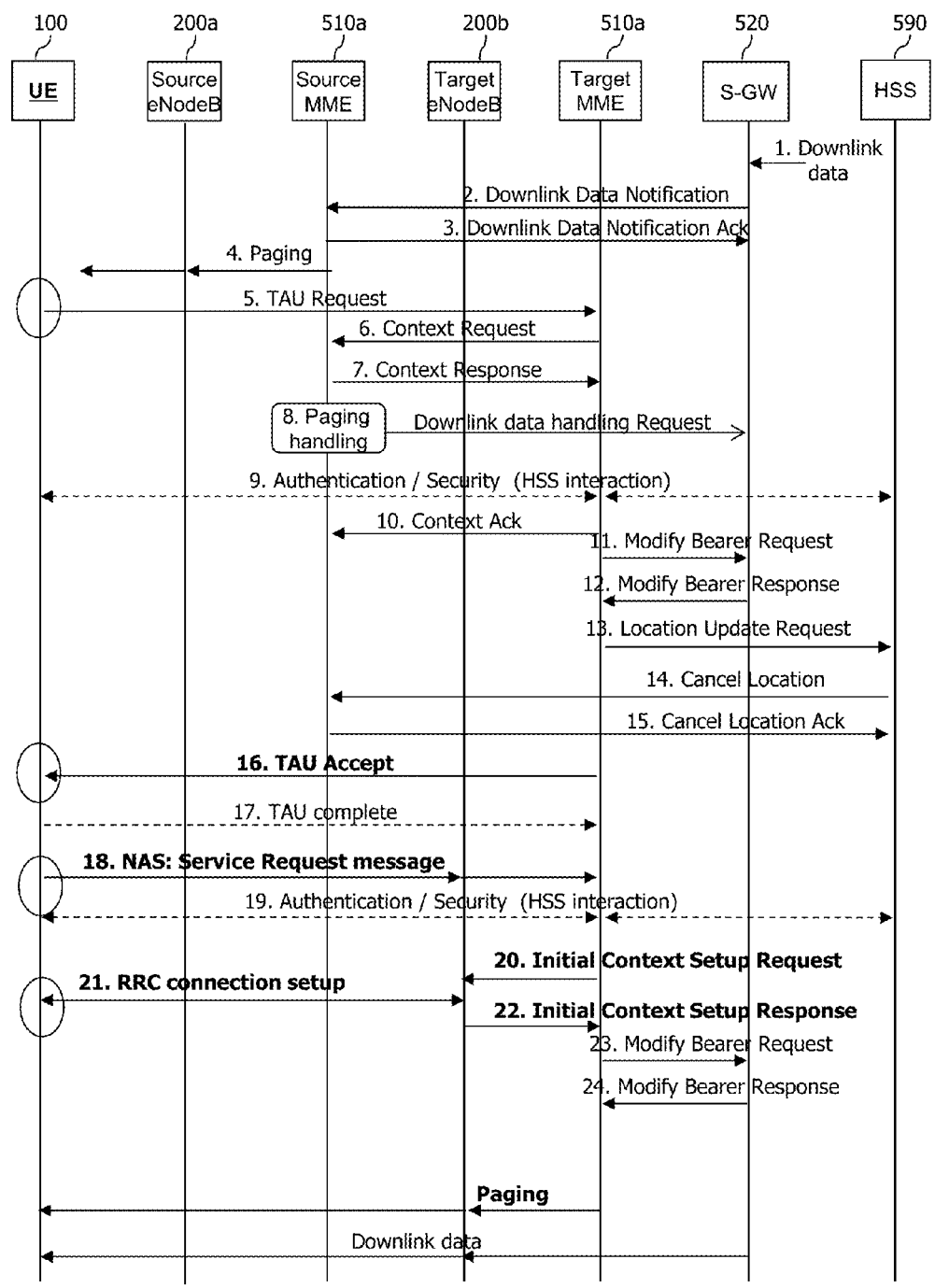
FIG. 16 is an exemplary view illustrating a TAU (Tracking Area Update) according to a sixth embodiment of the present invention.

Meanwhile, when receiving the paging signal, the UE 100 may conduct an RRC connection configuration procedure or transmit a service request message as shown in FIGS. 15 and 16.

Procedures 9a) and 9b) above may be done together with other processes.

10-17) similar to the process shown in FIG. 11.

Figure 13:
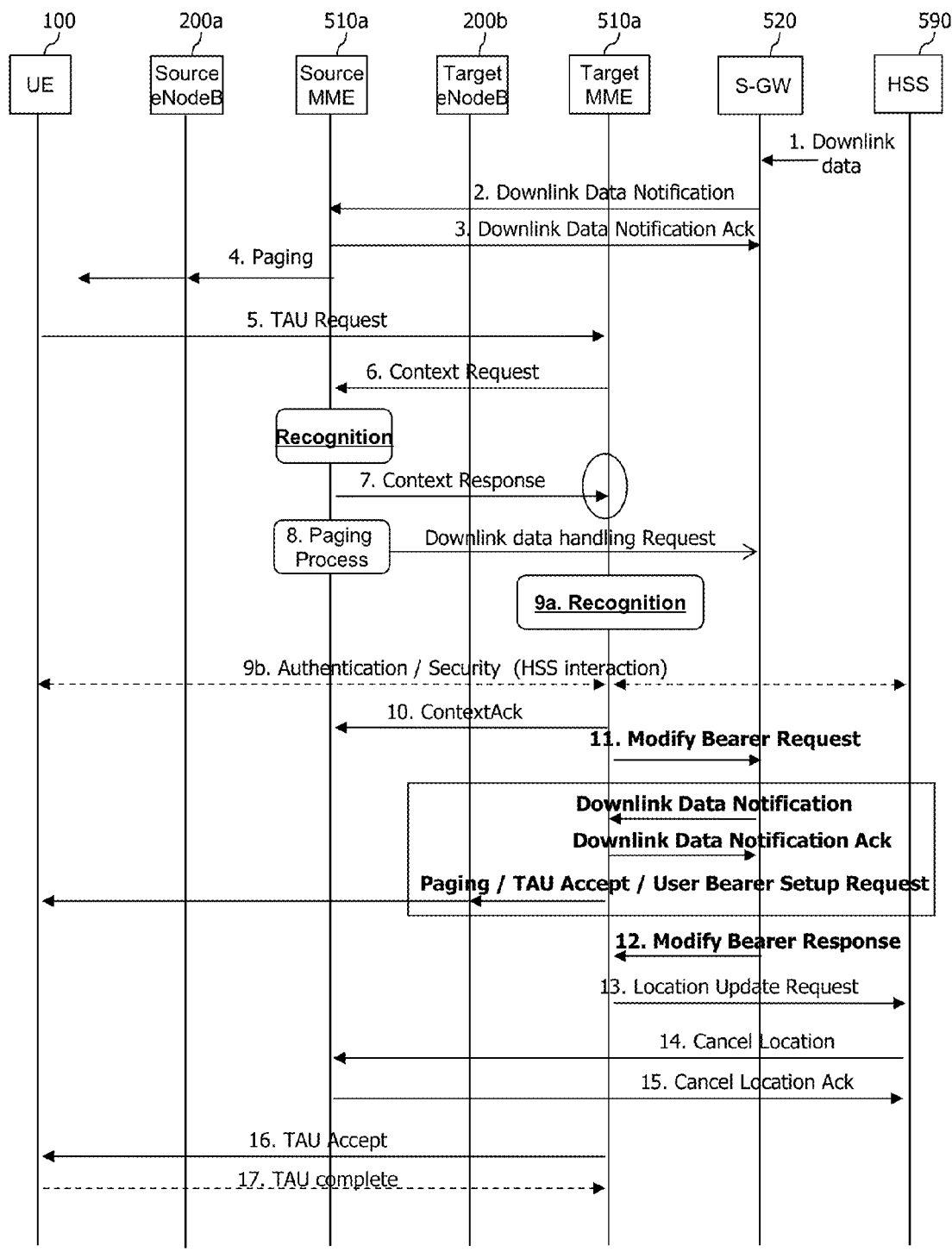
FIG. 13 is an exemplary view illustrating a TAU (Tracking Area Update) according to a third embodiment of the present invention.

FIG. 13 is a view illustrating an exemplary TAU (Tracking Area Update) procedure according to a third embodiment of the present invention.

FIG. 13 illustrates a scheme that may be performed by the target MME 510b according to the third embodiment of the present invention. The target MME 510b may send a request for downlink data notification to the S-GW 520.

All of the processes shown are similar to those shown in FIGS. 9 to 12. The description thus focuses on the differences between the two schemes, with similar processes skipped therefrom.

1-8) similar to those shown in FIGS. 11 to 13.

9a) as in process 7) of FIG. 11, when receiving a context response, the target MME 510b may recognize a problematic situation (where the source MME 510a has been sending a paging signal to the UE or there is downlink data for the UE).

10) similar to the process shown in FIG. 12.

11) the target MME 510b transmits a bearer modification request message to the S-GW 520. In this case, the target MME 510b has recognized the problematic situation as described above, and thus the target MME 510b includes in the bearer modification request message information indicating the problematic situation or information requesting to re-transmit a downlink data notification.

Then, the S-GW 520 may re-transmit the downlink data notification message to the target MME 510b. Further, the S-GW 520 may conduct a subsequent procedure and a task for organizing the downlink data notification message sent from the source MME 510a (for example, performing an internal procedure to cancel or stop the previous paging or sending a message for paging canceling or stopping to the source MME 510a).

When receiving the downlink data notification message from the S-GW 520, the target MME 510b may conduct a procedure for paging. Or, according to a combination of other embodiments of the present invention, the target MME 510b may conduct paging optimization or create and transmit a TAU accept message including specific information or a message for user plane bearer setup.

12) the S-GW 520 transmits a bearer modification request response message to the target MME 510b. In this case, the bearer modification request response message may contain information indicating to advance the time of user plane bearer setup. This information may have influence when the target MME 510b creates a message to be sent to the UE 100, and if needed, additional information used to for user plane bearer setup may be transmitted together. Or, the information included in the downlink data notification may be additionally included.

13) the target MME 510b may register the UE's new location in the HSS 590. In this case, some of what has been mentioned above may be stored in the HSS 590.

13-17) similar to the process shown in FIG. 11.

Figure 14:
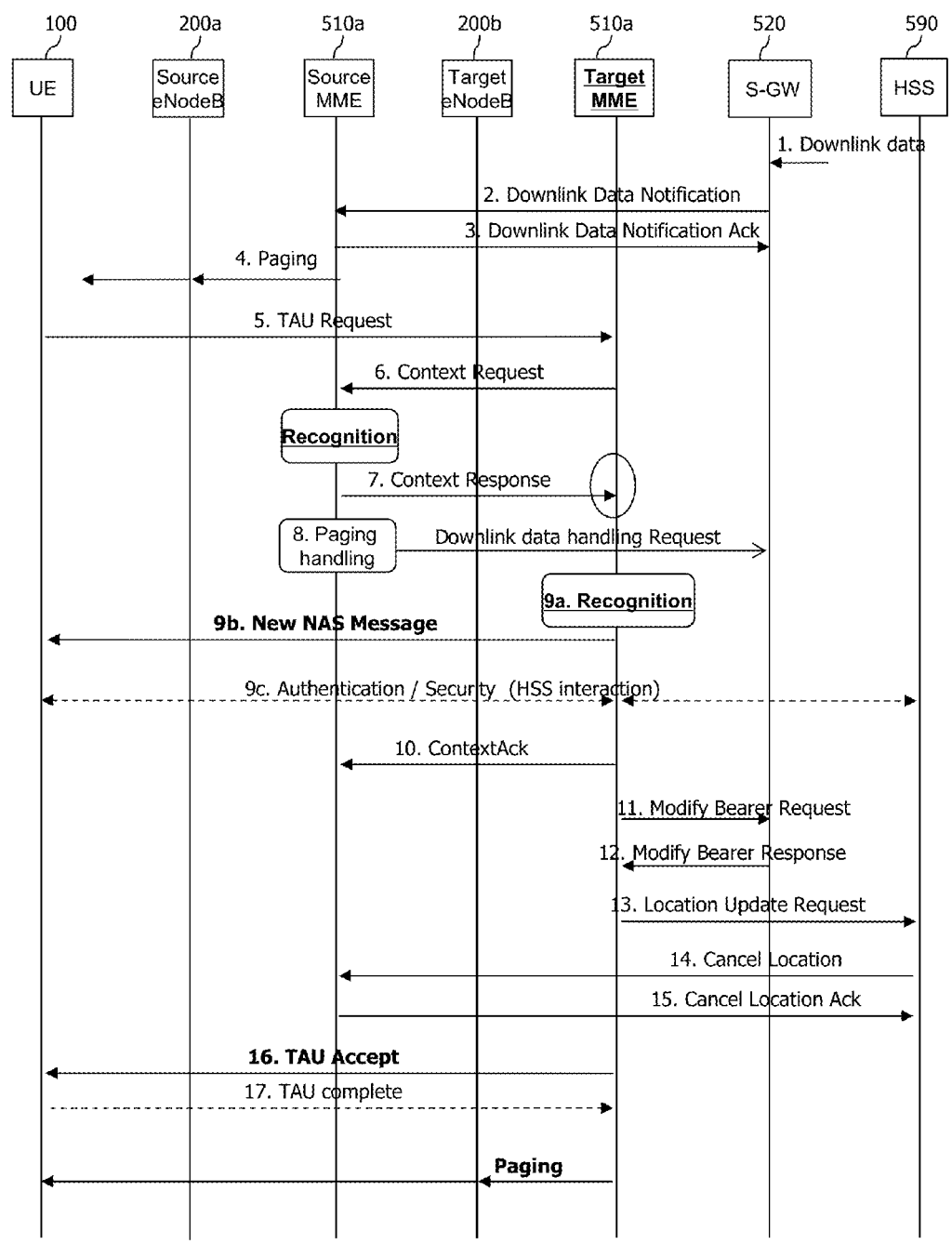
FIG. 14 is an exemplary view illustrating a TAU (Tracking Area Update) according to a fourth embodiment of the present invention.

FIG. 14 is a view illustrating an exemplary TAU (Tracking Area Update) procedure according to a fourth embodiment of the present invention.

FIG. 14 illustrates a scheme that may be conducted by the target MME 510b according to the fourth embodiment of the present invention. The target MME 510b may transmit an indication of transmission of a service request to the UE.

Most of the processes shown are similar to those shown in FIGS. 9 to 13. The description focuses on the differences between the two schemes, with similar processes skipped therefrom.

1-8) similar to the processes shown in FIGS. 11 to 13.

9a) as in process 7) of FIG. 11, when receiving a context response, the target MME 510b may recognize a problematic situation (where the source MME 510a has been sending a paging signal to the UE or there is downlink data for the UE).

9b) then, the source MME 510a may send to the UE 100 an indication including one of the following information pieces independently or in conjunction with several combinations of the embodiments of the present disclosure. Although in the drawings the indication is in the form of a new NAS (Non-Access Stratum) message, the indication may be included and transmitted in a TAU accept message.

TABLE 11 should immediately perform user plane bearer setup like service request should be conducted in response to paging
information regarding, upon paging response, whether to send a service request (for receiving general PS data) or an extended service request (for CSFB (Circuit Switch-Fallback) MT call)
call type information indicating which one of a user plane bearer setup procedure for CS calland a user plane bearer setup procedure for PS call is needed The above process may be conducted in conjunction with a TAU procedure.

Then, the UE 100 may prepare for a subsequent procedure based on the information shown in Table 11. Accordingly, the subsequent procedure may be very quickly done.

10-15) similar to the process shown in FIG. 11.

16) the target MME 510b transmits a TAU accept message.

The TAU accept message may include an indication as provided in process 9b as described above. The indication included in the TAU accept message may be, e.g., Active flag as described above.

The active flag is the one that used to be included in the TAU request message. According to an embodiment of the present invention, the same may be included in a TAU accept message. The target MME 510*b* includes the active flag in the TAU accept message and transmits the same, so that the UE may immediately perform a user plane bearer setup procedure.

FIG. 15 is a view illustrating an exemplary TAU (Tracking Area Update) procedure according to a fifth embodiment of the present invention.

FIG. 15 illustrates a scheme that may be performed by the target MME 510*b* according to the fifth embodiment of the present invention. The target MME 510*b* may request the target eNodeB 200*b* to set up a user plane bearer.

1-10) similar to each process shown in FIGS. 11 to 14.

10a) as in process 7) of FIG. 11, when receiving a context response, the target MME 510*b* may recognize a problematic situation (where the source MME 510*a* has been transmitting a paging signal to the UE or there is downlink data for the UE). Then, the target MME 510*b* sends an initial context setup request to the target eNodeB 200*b* for performing user plane bearer setup. In this case, as shown in FIG. 12, with the recognition, the target MME 510*b* may immediately perform paging.

10b) the target eNodeB 200*b* configures a radio section for a user plane bearer through a process for RRC connection setup. That is, the target eNodeB 200*b* may enable RRC connection setup to be triggered by transmitting a higher level signal to the UE 100. Or, the target eNodeB 200*b* may perform RRC connection setup by transmitting an RRC connection reconfiguration message to the UE 100 and receiving an RRC reconfiguration complete message from the UE 100. Or, the target eNodeB 200*b* may perform RRC connection setup by transmitting an RRC-based radio bearer setup message to the UE 100 and receiving an RRC-based radio bearer setup complete message from the UE 100. Or, as shown in FIG. 12, the target MME 510*b* may perform a paging procedure immediately after the recognition, and the target eNodeB 200*b* may receive the paging signal and transfer the same to the UE 100, allowing RRC connection setup to be triggered. Then, the UE 100 may transmit an RRC connection request message to the target eNodeB 200*b*, and the target eNodeB 200*b* may transmit an RRC connection setup message to the UE 100, and the UE 100 may transmit an RRC connection setup complete message to the target eNodeB 200*b*. RRC connection setup may be done so.

The UE 100 may perform an RRC connection setup procedure when receiving a higher level signal or paging signal from the target eNodeB 200*b*.

10c) subsequently, the target eNodeB 200*b* transmits an initial context setup response message to the target MME 510*b*.

11-17) similar to each process shown in FIGS. 11 to 14.

FIG. 16 is a view illustrating an exemplary TAU (Tracking Area Update) procedure according to a sixth embodiment of the present invention.

FIG. 16 illustrates a scheme that may be performed by the UE 100 according to the sixth embodiment of the present invention.

1-15) similar to each process shown in FIGS. 11 to 15.

16) as in process 7) of FIG. 11, when receiving a context response, the target MME 510*b* may recognize a problematic situation (where the source MME 510*a* has been transmitting a paging signal to the UE or there is downlink data for the UE). Then, the target MME 510*b* transmits a TAU accept message to the UE 100.

The TAU accept message may contain the information shown in Table 11. Alternatively, the information in Table 11 may be transmitted in a new separate NAS message, rather than included in the TAU accept message. The use of the new NAS message advantageously allows the UE 100 to start user plane bearer setup relatively earlier because the UE 100 may receive the information earlier. The benefits that come from the method in which information as shown in Table 11 is contained and transmitted in the TAU accept message would not change the procedure according to the prior art.

17) similar to the processes shown in FIGS. 11 to 15.

18) when receiving information indicating a request for user plane bearer setup, the UE 100 transmits a service request message to the target eNodeB 200*b*. As per the prior art, the UE 100 does not receive information requesting user plane bearer setup from a network during a TAU process or as a result of a TAU process. In other words, the UE 100 does not attempt to request a service, while according to an embodiment as shown in FIG. 16, it can be made possible. The service request message is an NAS-based message. When receiving the service request message, the target eNodeB 200*b* includes it in an initial UE message (i.e., Initial UE Message) and transmits the same to the target MME 510*b*.

19) similar to the processes shown in FIGS. 11 to 15.

20) the target MME 510*b* transmits an initial context setup request message to the target eNodeB 200*b* to perform user plane bearer setup.

21) the target eNodeB 200*b* and the UE 100 configure a radio section for user plane bearer setup through a process for RRC connection setup. To that end, the target eNodeB 200*b* transmits an RRC-based radio bearer setup message to the UE 100 and receives an RRC-based radio bearer setup complete message from the UE 100. Or, the UE 100 transmits an RRC connection request message to the target eNodeB 200*b*, and the target eNodeB 200*b* transmits an RRC connection setup message to the UE 100, and the UE 100 transmits a connection setup complete message to the target eNodeB 200*b*. RRC connection setup is done so.

22-24) similar the processes shown in FIGS. 11 to 15.

Then, the downlink data buffered in the S-GW 520 may be transferred to the UE 100 via the target eNodeB 200*b*.

Figure 17:
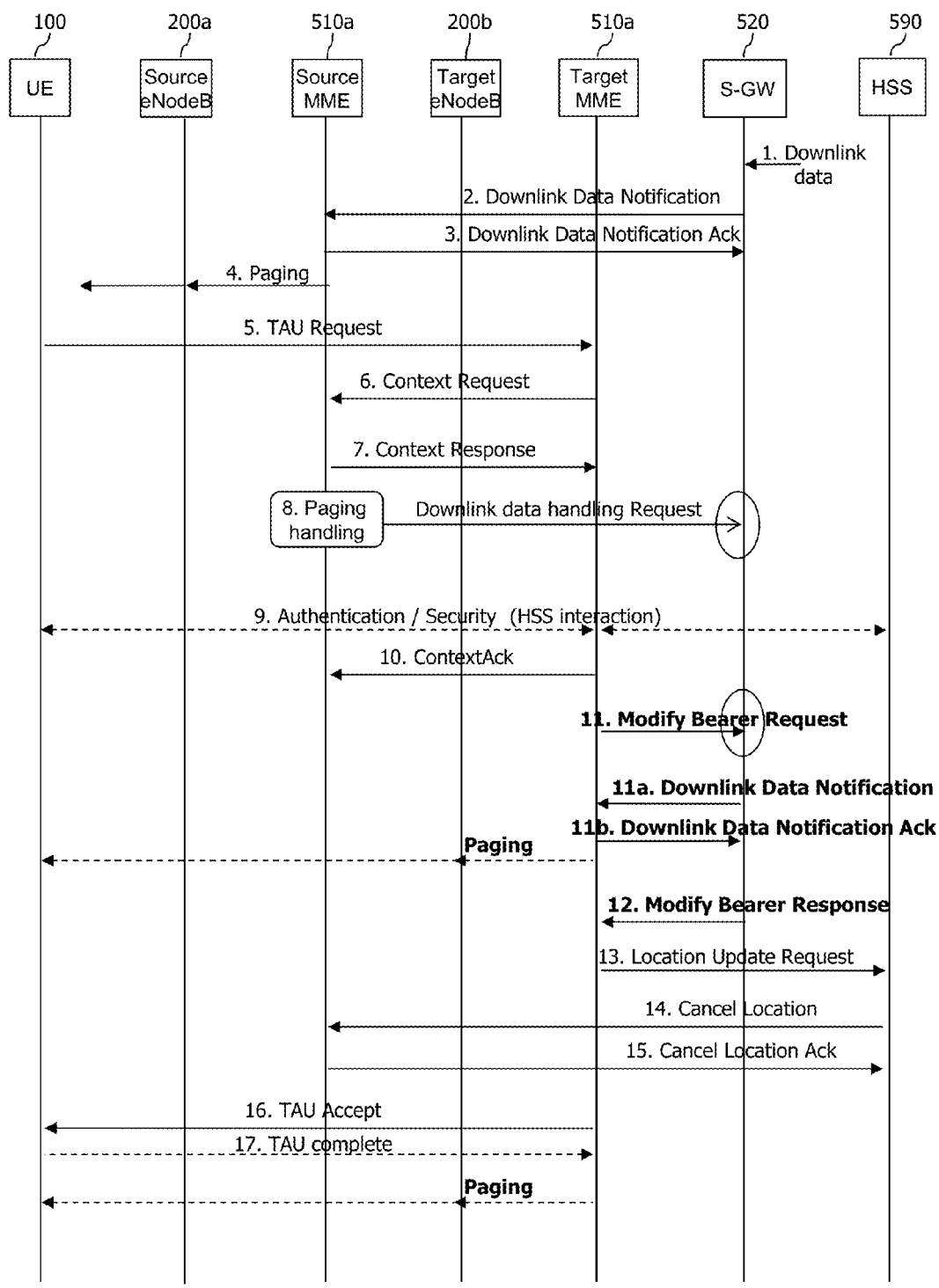
FIG. 17 is an exemplary view illustrating a TAU (Tracking Area Update) according to a seventh embodiment of the present invention.

FIG. 17 is a view illustrating a TAU (Tracking Area Update) procedure according to a seventh embodiment of the present invention.

FIG. 17 illustrates a scheme that may be performed by the S-GW 520 according to the seventh embodiment of the present invention.

1-7) similar to each process shown in FIGS. 11 to 15.

8) the source MME 510*a*, even when subsequently failing to receive a response from the UE until the paging timer, e.g., T3423 timer, expires, ☐ does not re-transmit a paging signal, ☐ nor does the source MME 510*a* send a message regarding the paging failure to the S-GW 520. According to the prior art, the source MME 510*a* may perform a paging re-transmission policy, and when receiving a message regarding paging failure, the S-GW 520 deletes the downlink data buffered for the UE. The above prevents this.

In a more active method, the source MME 510*a* may transmit to the S-GW 520 a downlink data handling request message including one or more of a request for keeping buffering the downlink data and a request for re-transmitting a downlink data notification after recognizing the target MME 510*b*.

Process 8) above may be performed in conjunction with other processes without bothered by the order as shown.

Then, the S-GW 520 keeps buffering the downlink data and re-transmits the downlink data notification to the target MME 510*b*. When receiving the request from the target MME 510b, the S-GW 520, even receiving a notification of paging failure from the target MME 510b, does not discard but may maintain the buffered downlink data.

9) similar to the process shown in FIG. 10.

11) as in process 7) of FIG. 11, when receiving a context response, the target MME 510b may recognize a problematic situation (where the source MME 510a has been transmitting a paging signal to the UE or there is downlink data for the UE). Then, the target MME 510b transmits a bearer modification request message to the S-GW 520. The bearer modification request message may contain information indicating the problematic situation or information requesting re-transmission of the downlink data notification.

11a) then, the S-GW 520 may re-transmit the downlink data notification message to the target MME 510b. Further, the S-GW 520 may organize or perform a subsequent process on the downlink data notification message sent to the source MME 510a (e.g., performing an internal procedure to cancel or stop the previous paging or transmitting a message regarding canceling or stopping the paging to the source MME 510a).

When receiving the downlink data notification message from the S-GW 520, the target MME 510b may perform a procedure for paging, or according to a combination of the embodiments of the present invention, may conduct paging optimization or create a TAU accept message containing specific information or a message for user plane bearer setup and send the same.

11b) the target MME 510b transmits a downlink data notification acknowledgement message.

12) the S-GW 520 transmits a bearer modification response message to the target MME 510b. The bearer modification response message may contain information triggering a procedure for advancing the time of user plane bearer setup. This information may have an influence when the source MME 510a creates a message to be sent to the UE 100, and if needed, additional information for use in user plane bearer setup may be transmitted together. Or, the information included in the downlink data notification may be additionally included.

13-17) similar to each process shown in FIGS. 11 to 16.

The above embodiments assume an E-UTRAN TAU procedure without a change of responsible S-GW, and the description thereof may be expanded to the situation where several TAU procedures are performed according to the prior art or to other access networks/core networks such as RAU/LAU.

Further, varied or added information may be obtained by adding new parameters/fields/information, by expanding existing parameters/fields/information or by combining various parameters/fields/information, or may come with a newly defined message that has not been existent in the prior art.

The above-described embodiments may be combined with one another. It should be appreciated by those skilled in the art that the embodiments may be easily combined with each other, and thus, detailed description of the combinations is skipped. Nonetheless, it should be noted that such combinations are not excluded from the scope of the present invention.

Figure 18:
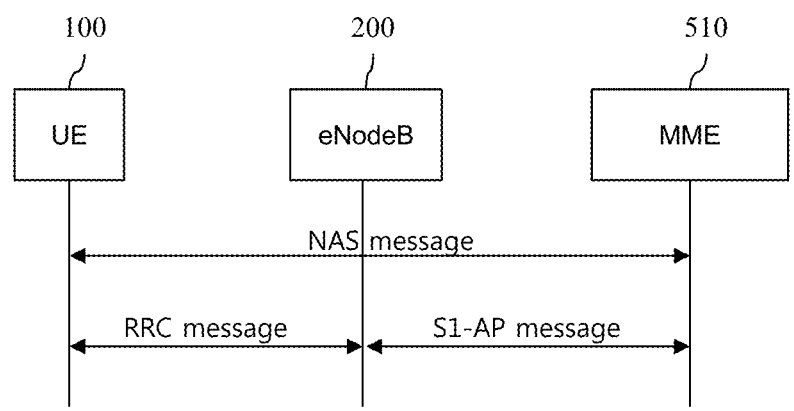
FIG. 18 is a view illustrating an exemplary protocol and interfaces between a UE, an eNodeB, and an MME.

FIG. 18 is a view illustrating an exemplary protocol and interfaces between a UE, an eNodeB, and an MME.

As shown in FIG. 18, the messages communicated between the UE 100 and the eNodeB 200 are based on an RRC (Radio Resource Control) protocol. The messages communicated between the eNodeB 200 and the MME 510 are based on an S1-AP (S1 Application Protocol). The messages communicated between the UE 100 and the MME 510 are based on an NAS (Non-Access Stratum) protocol. The NAS protocol-based messages are capsulated into RRC protocol-based messages and S1-AP-based messages and transmitted.

The embodiments described thus far may be implemented in hardware, which is described below in connection with FIG. 19.

Figure 19:
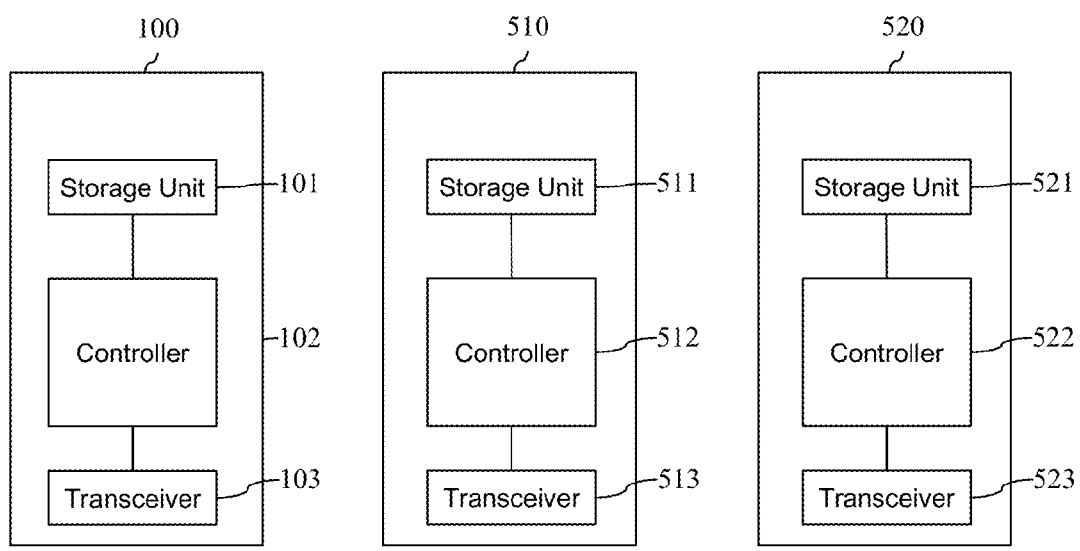
FIG. 19 is a block diagram illustrating the configuration of an MTC device 100, an MME 510, and an SGSN 520 according to an embodiment of the present invention.

FIG. 19 is a block diagram illustrating the configuration of an MTC device 100, an MME 510, and an SGSN 520 according to an embodiment of the present invention.

As shown in FIG. 19, the UE 100 includes a storage means 101, a controller 102, and a communication unit 103. The MME 510 includes a storage means 511, a controller 512, and a communication unit 513. Likewise, the S-GW 520 includes a storage means 521, a controller 522, and a communication unit 523.

The storage means 101, 511, and 521 store the methods described above in connection with FIGS. 9 to 18.

The controllers 102, 512, and 522 control the storage means 101, 511, and 521, and the communication units 103, 513, and 523. Specifically, the controllers 102, 512, and 522 respectively execute the methods stored in the storage means 101, 511, and 521. The controllers 102, 512, and 522 transmit the above-described signals through the communication units 103, 513, and 523.

Although the present invention has been shown or described in connection with preferred embodiments thereof, the present invention is not limited thereto, and rather, various changes or modifications may be made thereto without departing from the scope of the present invention defined by the following claims.

What is claimed is:

1. A method of processing a downlink data notification (DDN) message in a mobile communication network, the method comprising:

receiving, by a transceiver in a server, a DDN message from a serving gateway which buffers a downlink data to be delivered to a terminal; and transmitting, by the transceiver in the server, a message for requesting the serving gateway to keep buffering the downlink data and wait to receive a modify bearer request message from another server, if the terminal is under a tracking area update (TAU) procedure and if the server does not receive a response to a paging signal, but receives a context request message from the another server according to the TAU procedure.

2. The method of claim 1, further comprising:
transmitting the paging signal to the terminal before completing the TAU procedure.

3. The method of claim 2, further comprising:
not transmitting a reject message if the server does not receive the response to the paging signal from the terminal and if the server receives the context request message from the another server during the TAU procedure.

4. The method of claim 1, further comprising:
receiving the context request message from the another server; and
transmitting a context response message to the another server,
wherein the context response message includes at least one of:
    information on a paging procedure;
    information required for allowing the another server to perform the paging procedure or information required to setup a user plane bearer; and information for requesting not to perform a reselection or relocation of the serving gateway.

5. The method of claim 4, wherein the information on the paging procedure includes:
   information for indicating that the DDN message has been received;
   information for indicating that the paging procedure for the terminal is being performed; and
   information for informing that the user plane bearer is needed to be set up in the another server.

6. The method of claim 3, wherein if the server does not receive the response to the paging signal from the terminal and if the server receives the context request message from the another server, the server is aware that a paging procedure will have failed.

7. The method of claim 1, wherein the transmitted message triggers a retransmission of the DDN message to the another server.

8. A server managing mobility for processing a downlink data notification (DDN) message in a mobile communication network, the server comprising:
   a transceiver configured to receive a DDN message from a serving gateway which buffers a downlink data to be delivered to a terminal; and
   a controller configured to control the transceiver to transmit a message for requesting the serving gateway to keep buffering the downlink data and wait to receive a modify bearer request message from another server, if the terminal is under a tracking area update (TAU) procedure and if the server does not receive a response to a paging signal, but receives a context request message from the another server according to the TAU procedure.

9. The server of claim 8, wherein the controller is further configured to transmit the paging signal to the terminal before completing the TAU procedure.

10. The server of claim 9, wherein the controller is further configured to not transmit a reject message if the server does not receive the response to the paging signal from the terminal and if the server receives the context request message from the another server during the TAU procedure.

11. The server of claim 8, wherein the controller is further configured to:
   receive the context request message from the another server, and
   transmit a context response message to the another server, wherein the context response message includes at least one of:
      information on a paging procedure;
      information required for allowing the another server to perform the paging procedure or information required to setup a user plane bearer; and
      information for requesting not to perform a reselection or relocation of the serving gateway.

12. The server of claim 11, wherein the information on the paging procedure includes:
   information for indicating that the DDN message has been received;
   information for indicating that the paging procedure for the terminal is being performed; and
   information for informing that the user plane bearer is needed to be set up in the another server.

13. The server of claim 10, wherein if the server does not receive the response to the paging signal from the terminal and if the server receives the context request message from the another server, the server is aware that a paging procedure will have failed.

* * * * *